(12) United States Patent
Jayasuriya et al.

(10) Patent No.: US 8,246,091 B1
(45) Date of Patent: Aug. 21, 2012

(54) INERTIA-LOCKING REACTIVE BUMPER FOR MOTOR VEHICLE

(75) Inventors: Mangala M. Jayasuriya, Bloomfield Hills, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/206,571

(22) Filed: Aug. 10, 2011

(51) Int. Cl.
*B60R 19/26* (2006.01)
(52) U.S. Cl. ......... 293/133; 293/132; 180/274; 188/371
(58) Field of Classification Search .......... 293/132, 293/133, 135, 136, 137; 180/274; 188/371
See application file for complete search history.

(56) References Cited

U.S. PATENT DOCUMENTS

| | | | |
|---|---|---|---|
| 5,443,146 A * | 8/1995 | Ayyildiz et al. | 188/374 |
| 5,967,573 A | 10/1999 | Wang | |
| 6,019,419 A | 2/2000 | Browne et al. | |
| 6,050,624 A * | 4/2000 | Kim | 293/132 |
| 6,834,898 B2 | 12/2004 | Wang et al. | |
| 6,976,718 B2 | 12/2005 | Nakanishi | |
| 2011/0042975 A1 | 2/2011 | Faruque | |

OTHER PUBLICATIONS

Peter J. Schuster, California Polytechnic State University, SAE International, Current Trends in Bumper Design for Pedestrian Impact, Paper No. 2006-01-0464, 2006.
IUsedAutoParts.Com, Find Your Bumper Impact Absorber Rear Now, May 4, 2011.
Transportation Research Board, TRID, Vehicle Hood and Bumper Structure Design to Mitigate Casualities of Pedestrian Accidents, Publication Date: Jun. 2005, Last Modified: May 10, 2009.
J.T. Wang, General Motors Corporation, Untied States Paper No. 05-0144, An Extendable and Retractable Bumper, Jun. 6, 2005.

* cited by examiner

*Primary Examiner* — Joseph Pape
(74) *Attorney, Agent, or Firm* — Greg P. Brown; Brooks Kushman P.C.

(57) ABSTRACT

An energy-absorbing front end structure for a motor vehicle includes a pair of frame rails, struts (crushable members) made movable relative to the frame rails along a longitudinal axis, a bumper beam supported by the struts, and a spring resisting rearward movement of each strut relative to the frame rail. An inertia-activated locking device inhibits rearward movement of the strut when the vehicle undergoes a longitudinal deceleration above a threshold level so that the strut may absorb crash energy in a high-speed collision. If the vehicle is involved in a lower energy collision, such as with a pedestrian, the deceleration experienced by the vehicle is below the threshold level and the strut remains in an unlocked condition in which it is able to move rearward against the spring to lessen the crash energy transmitted to the pedestrian.

20 Claims, 4 Drawing Sheets

INERTIA-LOCKING REACTIVE BUMPER FOR MOTOR VEHICLE

TECHNICAL FIELD

The present invention relates to a bumper for a motor vehicle, and more specifically to such a bumper that operates in one of two energy absorbing modes depending upon the level of deceleration the vehicle experiences during a collision.

BACKGROUND

Many motor vehicle front bumper systems utilize crush cans between the bumper beam and the vehicle frame. The crush cans are engineered to deform in a predictable fashion when subjected to compressive force during a relatively high-speed frontal collision in order to absorb kinetic energy. By design, the crush cans only deform when the crash/impact is of such a severity (in terms of the level of deceleration experienced by the vehicle) that other occupant safety systems alone may not be able to adequately protect the occupants.

In a collision between a motor vehicle and a pedestrian, the force applied to the vehicle bumper is usually well below that which will result in deformation of the crush cans, so that the cans offer no protection to the pedestrian. Other features or devices may be provided to reduce the likelihood and/or severity of injury experienced by a pedestrian.

Vehicle-mounted systems have been proposed using some type of sensor (contact, radar, lidar, optical, etc.) to detect and/or predict a collision with a pedestrian. When a pedestrian collision is detected or predicted, some sort of countermeasure is activated or deployed to moderate the impact experienced by the pedestrian. Such systems require complicated sensors and electro-mechanical systems to function properly and reliably.

SUMMARY

To solve at least one problem in the prior art, a bumper system is disclosed which has utilized a deceleration-activated trigger to alternatively lock the bumper system or allow rearward motion of the bumper beam during a low-g (from the vehicle frame-of-reference) impact with.

In a disclosed embodiment of the invention, apparatus for mounting a bumper beam to a frame of an automotive vehicle comprises a strut having a forward end adapted for attachment to the bumper beam and a rear end adapted for engagement with the frame for rearward movement relative thereto along an impact axis, and an inertia-activated locking device. The locking device inhibits rearward movement of the strut when the strut experiences impact deceleration above a threshold level. The locking device comprises at least one first engagement member adapted for fixed mounting relative to the frame, at least one second engagement member mounted to the strut disposed forward of the first engagement member, the strut movable rearward relative to the second engagement member along the impact axis, and at least one mass movably mounted relative to the strut. The mass is mounted such that impact deceleration above the threshold level results in the mass moving forward relative to the strut as a result of inertia. The inertial movement of the mass immobilizes the second engagement member relative to the strut such that rearward movement of the strut drives the second engagement member into locking contact with the first engagement member. Further rearward movement of the strut is prevented by the locking contact between the first and second engagement members, so that if the strut may bear the force of the impact.

Such a locking apparatus will not be triggered or locked when the vehicle collides with a pedestrian, so that the strut is able to move rearward through a long energy-absorbing stroke and thereby lessen the impact pulse experienced by the pedestrian.

In another disclosed embodiment, the mass has at least one ramped surface formed thereon, inertial movement of the mass urging the ramped surface against at least one locking plate and moving the locking plate to a locking position wherein it immobilizes the second engagement member.

In another disclosed embodiment, a bracket is mounted for movement relative to the vehicle frame along the impact axis, and has at least one ramped surface formed thereon. The inertial movement of the mass actuates a lock to prevent movement of the bracket relative to the frame, such that further movement of the strut actuates at least one locking plate to immobilize the second engagement member.

In another disclosed embodiment, a spring disposed between the strut and the frame is oriented to apply force against movement of the strut rearward relative to the impact axis. The spring serves to reduce the pulse applied to a pedestrian during a collision, and also to reset the strut and bumper to the original position after a collision in which the vehicle has sustained no damage.

In another disclosed embodiment, at least one of the first and second engagement members are wedge shaped.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The terms "automotive" and "motor vehicle", as used herein, refer to any wheeled vehicle intended for operation on or off of roadways, and includes (but is not limited to) cars, trucks, utility vehicles, cross-over vehicles, and construction equipment.

Figure 1:
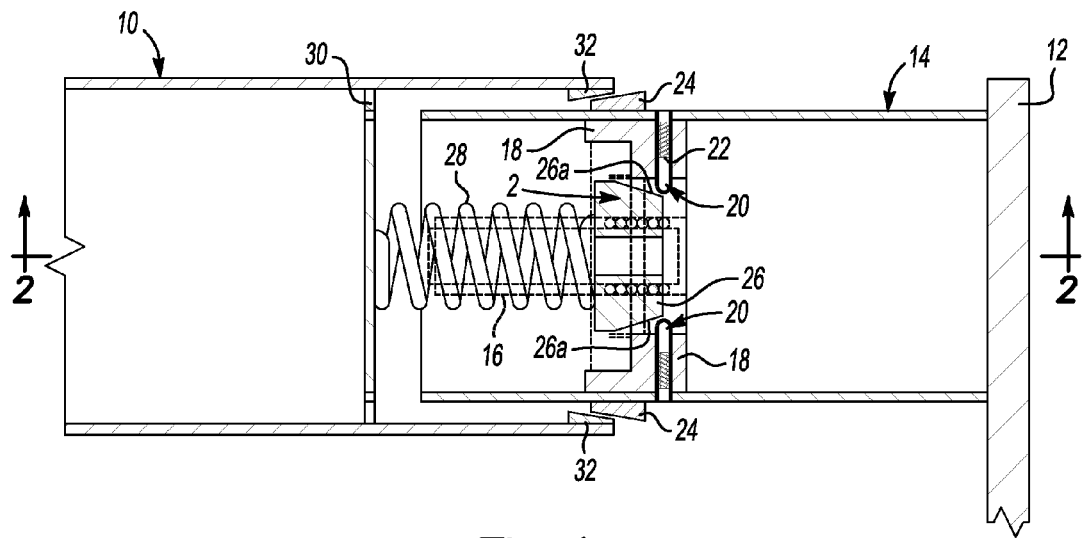
FIG. 1 is a schematic cut-away view of a bumper system according to an embodiment of the invention.
Figure 2:
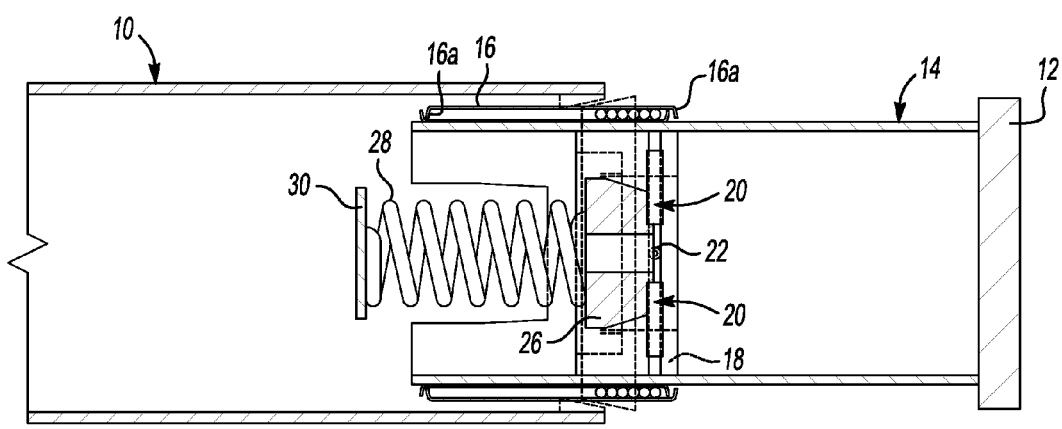
FIG. 2 is a schematic sectional view taken along line 2-2 in FIG. 1.

FIGS. 1 and 2 schematically show a forward portion of a vehicle frame rail 10 and a front bumper beam 12. Bumper beam 12 is attached to the forward end of a strut 14, and the beam/strut combination is movable relative to the frame rail 10 along a longitudinal axis of the vehicle. In a typical motor vehicle, a front bumper beam will be mounted to two struts, one attached to each of two longitudinal frame rails at or near the outboard portions of the vehicle body. The longitudinal movement of strut 14 may be achieved, for example, by guide tracks 16 mounted between the strut and the frame and using ball bearings, roller bearings, or similar means. Guide tracks 16 may include overlapping end plates 16a or other features that limit the range of forward/rearward travel of strut 14 relative to frame rail 10.

Strut 14 may be what is known in the vehicle safety industry as a crush can: a tubular member engineered to deform (or crush) under a longitudinal load such as will be applied by a high-speed front end collision. Deformation of the crush can absorbs kinetic energy of the crash and thereby protects occupants of the vehicle from injury.

For simplicity, strut 14 and the corresponding portion of frame 10 are described as being rectangular in cross section. However, the invention may alternatively be practiced in relation to a strut and frame having any other polygonal, circular, or irregular cross section, or an open cross section of any appropriate shape. A support block 18 is secured within strut 14 and holds locking plates 20 which are movable outwardly relative to the support block and strut. Plate springs 22 bias locking plates 20 inwardly, toward the longitudinal centerline of strut 14, so that the plates do not extend past the outer surface of the strut 14. Two locking plates 20 are shown in symmetrically locations relative to the longitudinal axis of the strut 14, however any number of plates may be used.

One or more engagement blocks 24 are located adjacent the outer surface of strut 14 at positions corresponding to plates 20. Engagement blocks 24 are mounted in such a way that they can slide longitudinally over the outer surface of the strut 14 so long as locking plates 20 do not project beyond the outer surface of the strut. The outer surfaces of engagement blocks 24 are angled, as shown.

A trigger mass 26 is housed partially inside a longitudinal hole in support block 18. A reset spring 28 is located between a back plate 30 fixed to the rail 10 and the rear surface of support block 18. Reset spring 28 is shown schematically as a coil spring, but any type of kinetic energy storage/return device may be used. Rearward movement of trigger mass 26 may be arrested by contact with spring 28 or with other structure related to support block 18. Trigger mass 26 may be conical or frustoconical, with the sloping forward surface contacting a plurality of symmetrically positioned locking plates 20.

Frame blocks 32 are fixed to frame rail 10 at positions corresponding to engagement blocks 24 and/or locking plates 20. Alternatively, a single hollow frame block may completely encircle strut 14. Frame blocks 32 have tapered or angled inner surfaces that generally match the angle of engagement block outer surfaces, as shown.

During normal vehicle operation, strut 14 is in the neutral, pre-impact condition shown in FIGS. 1 and 2 wherein the rear portion of the strut is inside of frame rail 10. Strut 14 is restrained against forward movement by guide tracks 16 or other mechanical interference between the strut 14 and frame 10. Reset spring 28 is uncompressed (or slightly compressed) between frame rail 10 and support block 18. Inner ends of locking plates 20 are lightly contacting (or just clear of) trigger mass 26 and are spring-biased inwardly relative to strut 14 and support block 18.

Figure 3:
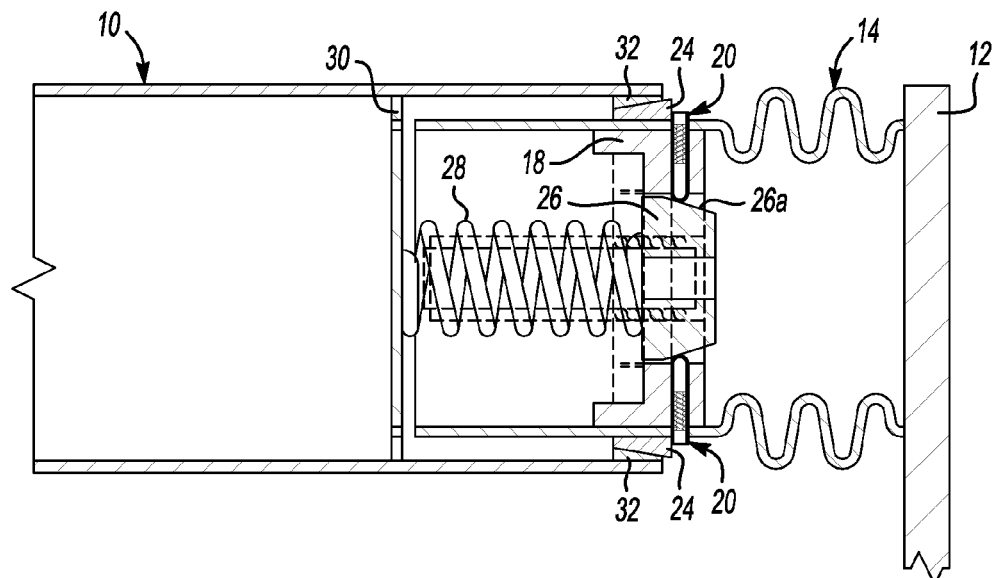
FIG. 3 is a schematic view of the bumper system of FIGS. 1 and 2 after a collision with another vehicle or other high-mass object.

In a relatively severe frontal crash event in which occupant safety dictates that the struts be used to absorb crash energy, the deceleration pulse experienced by the vehicle at the onset of the impact is severe enough to apply a significant inertial force on the trigger mass 26, urging it forward relative to frame rail 10 and strut 14. The angled forward surface(s) 26a of trigger mass 26 push against the inner ends of locking plates 20, overcoming the force of the plate springs 22 and forcing the locking plates outwardly so that they project past the outer surface of strut 14. See FIG. 3. The degree of deceleration required for trigger mass 26 to actuate locking plates 20 in this manner may be defined as a threshold level. The threshold deceleration level is preferably selected to distinguish between a relatively high-energy collision and a relatively low-energy vehicle/pedestrian collision.

Bumper beam 12 begins to react to the vehicle impact (deforming somewhat) and applies rearward force to strut 14, urging it rearward. After the small amount of bumper-strut movement in the rear direction, locking plates 20 contact the forward faces of engagement blocks 24 so that the strut 14 cannot slide rearward independently of the engagement blocks. Engagement blocks 24 travel rearward along with strut 14 and are driven into locking contact with frame blocks 32, thereby locking the strut 14 against further rearward movement relative to frame rail 10. Strut 14 is thus subjected to a large compressive load and may crumple, if so designed, to manage loads in a high speed crash.

The pre-impact longitudinal gap between locking plates 20 and the forward faces of engagement blocks 24 may be selected to permit proper functioning of the bumper system over a range of impact relative velocities ($\Delta V$) between the vehicle and the object being struck by bumper beam 12. In the case where strut 14 is a crush can, for example, the plate 20/block 24 gap should be large enough to permit the crush can to deform properly at the lowest $\Delta V$ for which deformation is required.

Figure 4:
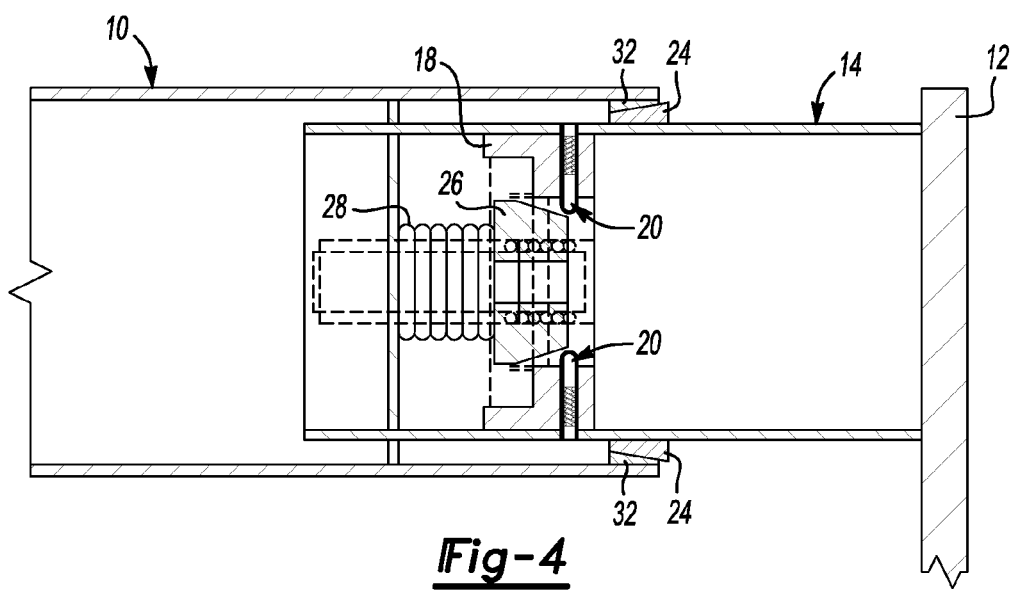
FIG. 4 is a schematic view of the bumper system of FIGS. 1 and 2 after a collision with a pedestrian.

Referring now to FIG. 4, if the vehicle is involved in a frontal collision with a pedestrian (or any other object that does not subject the vehicle to the threshold level of deceleration during an impact), trigger mass 26 does not accelerate forward from its inertial rest state with sufficient force to push the locking plates 20 outwardly against the force of plate springs 22. Bumper beam 12 and strut 14 are able to move rearward against the force of reset spring 28, thus absorbing a portion of the kinetic energy that would otherwise be applied to the pedestrian, and thereby reducing injury to the pedestrian. The force of reset spring 28 is tuned to properly control the level of deceleration applied to a pedestrian with the aim of reducing injuries.

The weight/mass of trigger mass 26 and the degree of mechanical resistance to motion (due to friction, springs, etc.) are selected such that the trigger mass 26 moves forward and actuates locking plates 20 only when the impact is severe enough that the strut 14 must be used to absorb crash energy for occupant protection. Trigger mass 26 may also be biased with a spring or other biasing element (not shown) resisting forward movement for a particular type of crash. The stroking (sliding) distance of strut 14 is determined based on the front component package and desired energy management of a particular vehicle front-end design to address a range of crash scenarios.

Reset spring 28 can be used for energy management during a pedestrian impact as well as to reset the bumper/strut 14 system back to original, pre-collision position in the event there is no damage to the vehicle front structure. Hence it is possible to provide protection for a pedestrian struck by the vehicle, while also providing the protection for the occupants of a vehicle in a more severe crash. The system may further be tuned to reduce low speed damage in a bumper-to-bumper crash.

Figure 5:
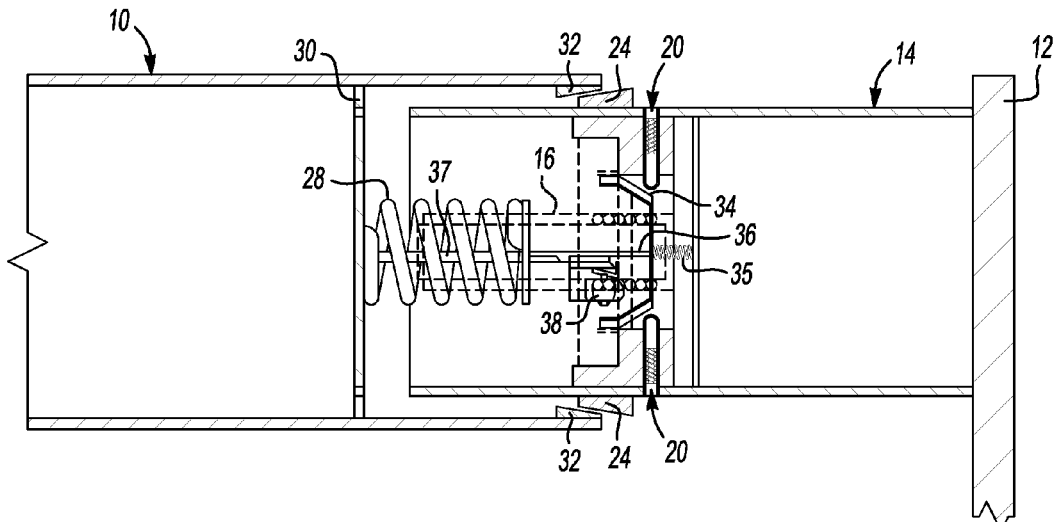
FIG. 5 is a schematic cut-away view of a bumper system according to another embodiment of the invention.
Figure 6:
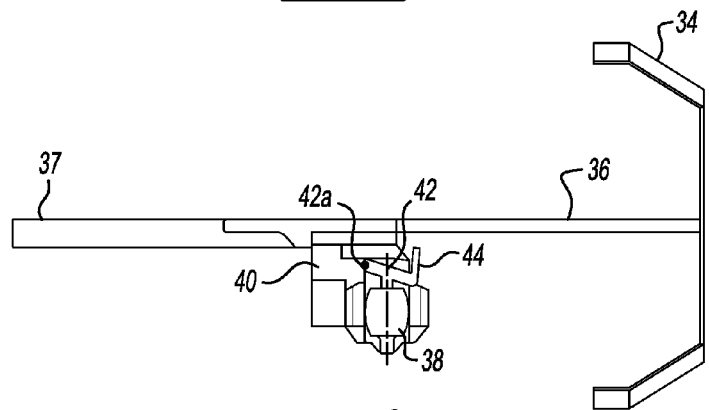
FIG. 6 is a schematic view of the bracket and locking mechanism of FIG. 5 prior to a high speed impact.
Figure 7:
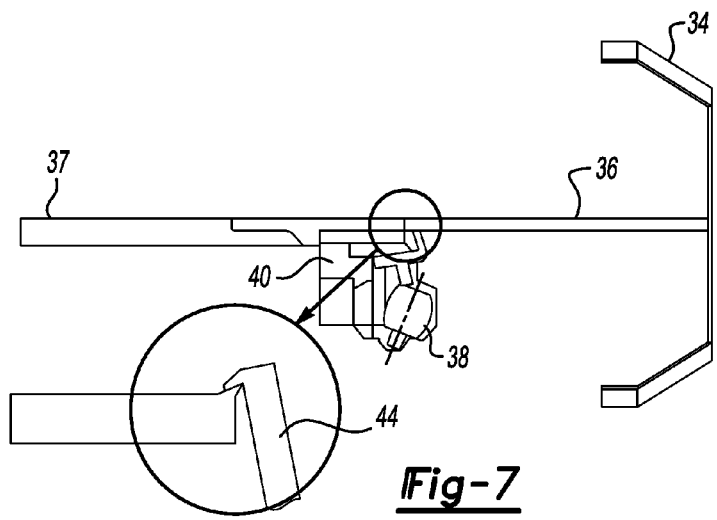
FIG. 7 is a schematic view of the bracket and locking mechanism of FIGS. 5 and 6 in a locked condition.
Figure 8:
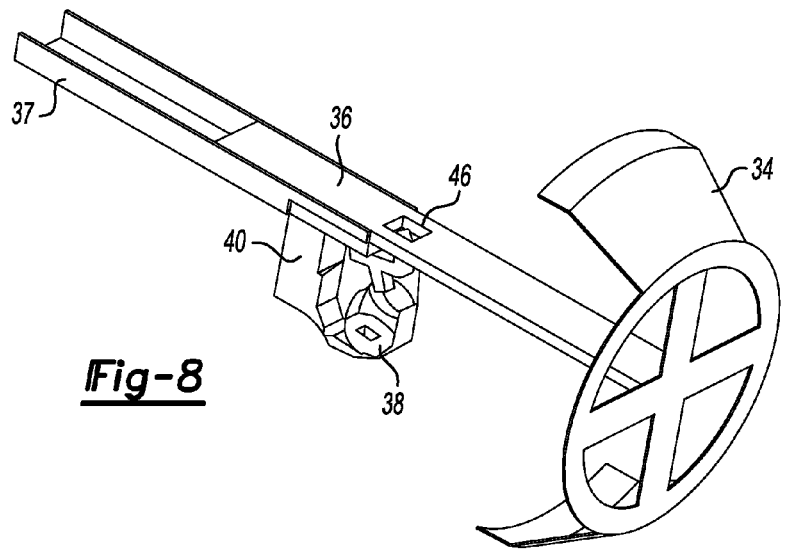

An alternative embodiment of an inertial locking system is shown in FIGS. 5 and 6, in which elements that are similar to those in the FIGS. 1-4 embodiment are identified by identical reference numbers. A bracket 34 has forward-facing angled surfaces located in alignment with spring-biased locking plates 20. A spring 35 may be provided to control movement of bracket 34. A bar 36 extends rearward from bracket 34 and slidingly or telescopingly engages a bar guide 37 fixed relative to frame rail 10. Bracket bar 36 and bar guide 37 may interact to allow a desired amount of movement (approximately 2-3 inches in one embodiment) of the bracket 34. An inertia ball 38 is retained loosely in a housing 40 such that it is free to move (tilt and/or roll, for example) forwardly when subjected to longitudinal deceleration. A lever 42 is movable about a pivot point 42a located at one end, and a lock pawl 44 extends upwardly toward the bracket 34. A spring or other biasing element (not shown) may be provided to resist movement of lever 42 about pivot point 42a and/or the movement of inertia ball 38 within housing 40. Such a mechanism may be similar to that known to be used in automobile seat-belt retractor mechanisms. The ball and lever mechanism may be mounted either to bracket 34 or bar guide 37.

At the onset of a frontal impact applying a deceleration to the vehicle that reaches the desired threshold level, ball 38 moves forward relative to housing 40 and actuates lever 42 upward about pivot point 42a so that locking pawl 44 engages a slot 46 in bracket bar 36. When pawl 44 engages slot 46, bracket bar 36 is locked against rearward movement relative to the bar guide 36. Hence the entire bracket 34 is held in position such that, as the strut 14 initially moves rearward the locking plates 20 ride on the angled forward surfaces of the bracket 34 and are urged outwardly to engage the engagement block 24 during initial few millimeters of travel of the strut 14, thus locking the strut against further rearward movement relative to frame 20.

Figure 9:
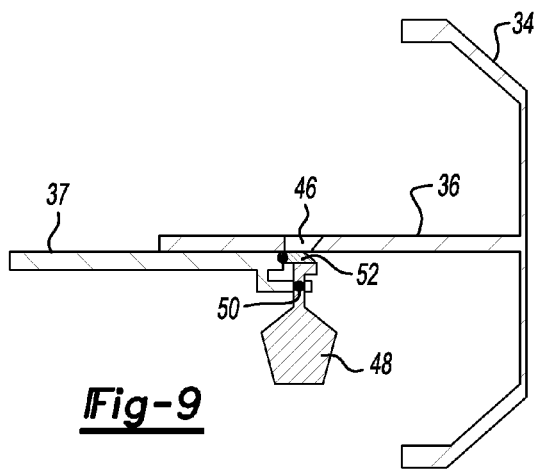
FIG. 9 is an alternative embodiment of a locking system using a pendulum with the locking mechanism in an unlocked condition.
Figure 10:
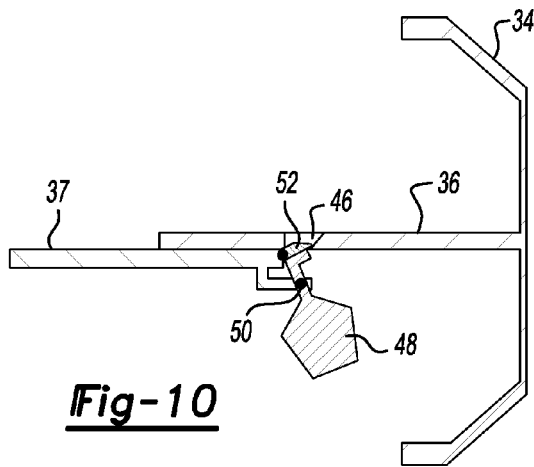
FIG. 10 is a schematic view of the pendulum of FIG. 9 with the locking mechanism in a locked condition.

In yet another embodiment of an inertia lock mechanism, shown in FIGS. 9 and 10, a pendulum 48 is suspended from a pivot 50 so that it is able to swing forward when the vehicle undergoes deceleration above a threshold level. Forward movement of pendulum 48 actuates a lever 52 upward into engagement with a slot 46 in bracket bar 36 to lock bracket 34 against rearward movement. Many different configurations and orientations of pendulum 48 and lever 42 will be apparent to one of skill in the art.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for mounting a bumper beam to a frame of an automotive vehicle comprising:
a strut having a forward end adapted for attachment to the bumper beam and a rear end adapted for engagement with the frame for rearward movement relative thereto along an impact axis; and
an inertia-activated locking device inhibiting rearward movement of the strut when the strut experiences an impact deceleration above a threshold level, the locking device comprising:
a first engagement member adapted for fixed mounting relative to the frame;
a second engagement member mounted to the strut disposed forward of the first engagement member, the strut movable rearward relative to the second engagement member along the impact axis; and
a mass movably mounted relative to the strut such that impact deceleration above the threshold applied to the strut causes an inertial movement of the mass forward relative to the strut, the inertial movement immobilizing the second engagement member relative to the strut such that rearward movement of the strut drives the second engagement member into locking contact with the first engagement member.

2. The apparatus of claim 1 further comprising a locking plate mounted to the strut and moveable along a locking axis to a locking position wherein contact between the locking plate and the second engagement member immobilizes the second engagement member.

3. The apparatus of claim 2 further comprising a ramp surface angled relative to the impact axis such that movement of the ramp surface parallel with the impact axis urges the locking plate to the locking position.

4. The apparatus of claim 3 wherein the ramp surface is fixed in relation to the mass, such that the inertial movement of the mass urges the ramp surface against the locking plate.

5. The apparatus of claim 3 wherein the ramp surface is part of a bracket retained for linear motion along the impact axis, such that the deceleration-induced movement of the mass actuates a lock restraining the bracket against movement.

6. The apparatus of claim 5 wherein the mass is retained in a housing and moves within the housing during deceleration, and the lock comprises a lever mechanism actuated by the movement of the mass.

7. The apparatus of claim 5 wherein the mass is a pendulum, and the lock is a lever mechanism actuated by movement of the pendulum during deceleration.

8. The apparatus of claim 1 further comprising:
a spring disposed between the strut and the frame and oriented to apply force against movement of the strut rearward relative to the impact axis.

9. The apparatus of claim 1 wherein the threshold is set at a level to distinguish between collisions wherein: a) the vehicle strikes a pedestrian; and b) the vehicle strikes an object substantially heavier than a pedestrian.

10. The apparatus of claim 1 wherein at least one of the first and second engagement members are wedge shaped.

11. The apparatus of claim 1 wherein the strut is a crush can.

12. A bumper system for an automotive vehicle comprising:
a forward bumper beam;
a guide adapted for attachment to a frame of the vehicle;
a strut having a forward end attached to the bumper beam and a rear end engaged with the guide for movement relative to the frame along an impact axis; and an inertia-activated locking device inhibiting rearward movement of the strut when the strut experiences an impact deceleration above a threshold level, the locking device comprising:
  a first engagement member adapted for fixed mounting relative to the frame;
  a second engagement member mounted to the strut disposed forward of the first engagement member, the strut movable rearward relative to the second engagement member along the impact axis; and
  a mass movably mounted relative to the strut such that impact deceleration above the threshold applied to the strut causes an inertial movement of the mass forward relative to the strut, the inertial movement immobilizing the second engagement member relative to the strut such that rearward movement of the strut moves the second engagement member into locking contact with the first engagement member.

13. The apparatus of claim 12 wherein the second engagement member is immobilized by contact with a locking plate mounted to the strut and moveable along a locking axis non-parallel with the impact axis, wherein movement of the strut urges an actuator into engagement with the locking plate and moves the locking plate along the locking axis to a locking position.

14. The apparatus of claim 13 wherein the actuator is a ramp surface angled relative to the impact axis such that the movement of the ramp surface relative to the locking plate moves the locking plate.

15. The apparatus of claim 14 wherein the ramp surface is fixed in relation to the mass, such that the inertial movement of the mass urges the ramp surface against the locking plate.

16. The apparatus of claim 14 wherein the ramp surface is formed on a bracket retained for linear motion along the impact axis, such that the deceleration-induced movement of the mass actuates a lock restraining the bracket against movement along the bracket guide.

17. An energy-absorbing front end structure for a vehicle comprising:
  a frame;
  a crush can supported by the frame for movement relative thereto along a longitudinal axis of the vehicle;
  a spring disposed on the frame and applying force to resist rearward movement of the crush can along the longitudinal axis;
  a bumper beam mounted to a forward end of the crush can; and
  an inertia-activated locking device inhibiting rearward movement of the crush can when the crush can undergoes/experiences a longitudinal deceleration above a threshold level, the locking device comprising:
    a first wedge fixed relative to the frame;
    a second wedge forward of the first wedge and movable relative to the crush can along the longitudinal axis when in an unlocked condition; and
    a mass movable along the longitudinal axis such that impact deceleration above the threshold causes an inertial movement of the mass forward relative to the crush can, the inertial movement of the mass immobilizing the second wedge relative to the crush can, such that rearward movement of the crush can drives the second wedge into locking contact with the first wedge.

18. The apparatus of claim 17 wherein the second wedge is immobilized by contact with a locking plate mounted to the strut and moveable along a locking axis non-parallel with the impact axis, wherein movement of the strut urges an actuator into engagement with the locking plate and moves the locking plate along the locking axis to a locking position.

19. The apparatus of claim 18 wherein the actuator is a ramp surface angled relative to the impact axis such that the movement of the ramp surface relative to the locking plate moves the locking plate.

20. The apparatus of claim 19 wherein the ramp surface is fixed in relation to the mass, such that the inertial movement of the mass urges the ramp surface against the locking plate.

* * * * *